United States Patent [19]
Norris

[11] Patent Number: 5,878,030
[45] Date of Patent: Mar. 2, 1999

[54] TEST ACCESS PORT FOR ANALYZING HIGH-SPEED LOCAL AREA NETWORK SWITCHED ENVIRONMENT

[75] Inventor: W. Brian Norris, Raleigh, N.C.

[73] Assignee: Wandel & Goltermann Technologies, Inc., Research Triangle Park, N.C.

[21] Appl. No.: 666,024

[22] Filed: Jun. 19, 1996

[51] Int. Cl.⁶ .................................................. G01R 31/08
[52] U.S. Cl. .......................................... 370/241; 370/242
[58] Field of Search ..................................... 370/241, 245, 370/908, 910, 251, 242, 243, 244, 247, 249; 379/1, 5, 9, 24; 330/69; 395/180

[56] References Cited

U.S. PATENT DOCUMENTS

| | | | |
|---|---|---|---|
| 4,107,618 | 8/1978 | Ormond | 330/69 |
| 4,197,435 | 4/1980 | Jackson | 379/2 |
| 4,628,511 | 12/1986 | Stitzlein et al. | 371/22 |
| 4,792,753 | 12/1988 | Iwai | 370/244 |
| 4,829,244 | 5/1989 | Tom | 370/241 |
| 4,870,638 | 9/1989 | Kawano et al. | 370/13 |
| 4,996,695 | 2/1991 | Dack et al. | 375/10 |
| 5,081,627 | 1/1992 | Yu | 371/29.1 |
| 5,140,172 | 8/1992 | Flach | 307/112 |
| 5,195,124 | 3/1993 | Ishioka | 379/27 |
| 5,305,465 | 4/1994 | Flach | 455/6.1 |
| 5,329,519 | 7/1994 | I'Anson | 370/13 |
| 5,425,052 | 6/1995 | Webster et al. | 375/224 |
| 5,457,729 | 10/1995 | Hamman | 370/249 |
| 5,583,874 | 12/1996 | Smith | 370/245 |

*Primary Examiner*—Ajit Patel
*Assistant Examiner*—Ricardo M. Pizarro
*Attorney, Agent, or Firm*—William G. Dosse; Moore & Van Allen, PLLC

[57] ABSTRACT

An interfacing device having two operational amplifiers that have been manufactured on the same IC die have high-impedance input terminals connected directly to the two conductors of a local area network digital transmission line so as not to load or otherwise upset the impedance or other parameters of the transmission line. The output terminals of the operational amplifiers are connected to and match the input impedance of a digital transmission protocol analyzer. The gain of the operational amplifiers is arranged so as to replicate at the input of the analyzer the signals appearing on the local area network transmission line.

15 Claims, 1 Drawing Sheet

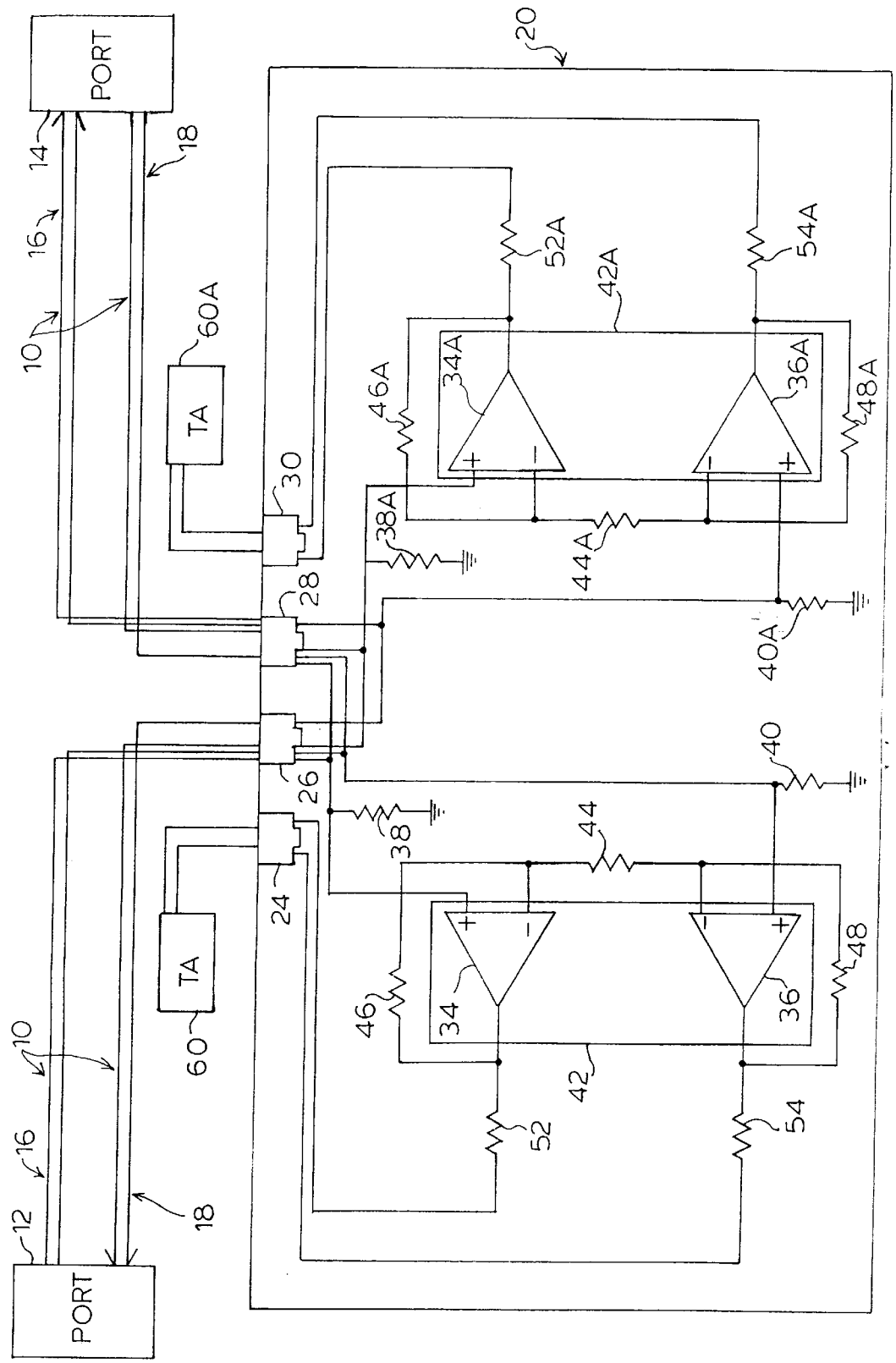

TEST ACCESS PORT FOR ANALYZING HIGH-SPEED LOCAL AREA NETWORK SWITCHED ENVIRONMENT

FIELD OF THE INVENTION

The present invention relates to analyzing local area networks and more particularly to network ports for facilitating the attachment of a local area network protocol analyzer to the data transmission path of a local area network without interfering with the high-speed data flow in the network.

BACKGROUND OF THE INVENTION

When operating high-speed, high-capacity, local area network data communications systems (eg., in the Ethernet environment) it is often necessary to monitor data transmission with an absolute minimum of intrusion or disruption of the data stream. The data stream is usually carried as one-volt-peak-to-peak push-pull pulses on a fifty-ohm coaxial medium or on a T-type twisted pair medium running in the ten-megabaud (ten million bits per second) to one-hundred-twenty-five megabaud range. The transmission can be in either simplex or half-duplex mode (respectively, transmission can be in one direction only or in two directions but not simultaneously), or transmission can be in full-duplex mode (both directions simultaneously, usually using two oppositely-directed simplex channels).

One of the more common families of existing transmission testing apparatus or transmission analyzers (TAs) has an input impedance of about one-hundred ohms. If such a TA were connected across (in parallel with) or in series with such a 50-ohm local area network data transmission channel or line, the input impedance of the TA could seriously disrupt the transmission channel's impedance match, with potentially dire consequences at a 10–125 megabaud transmission rate. At such high digital transmission speeds, frequency bandwidths are much higher than for sinusoidal signals such as television transmission. A familiarity with Fourier series analysis will aid in understanding why multimega-baud digital transmission requires so much higher bandwidth capability than sinusoidal transmission at the same frequency numbers.

In a local area network, a group of workstations is usually connected to a transmission line or to a digital switch by a circuit called a shared media hub (SMH) which sends all traffic from one workstation to all the other workstations that it serves in addition to sending that traffic to the switch, if required. To monitor simplex or half-duplex transmission between a SMH and a digital switch, the usual practice is to connect another SMH in the transmission line for the test.

Unless the SMH is connected into the line ab initio and left permanently in place, dedicated to testing that transmission line at that node, the transmission must be interrupted and restarted each time that the testing SMH is reconnected into the transmission line so that testing can be started. The transmission would again have to be interrupted to remove the SMH for use in a test somewhere else. Temporarily taking the transmission line out of service twice whenever the line is to be tested is usually unacceptable.

Permanently installing SMHs at any number of nodes of a transmission line for testing purposes only is also unacceptable when it is considered that a SMH can cost about $3,000. Also, most SMHs, as presently available, are for simplex transmission only and would not support the very common full duplex transmission without the addition of a second SMH. Reasonable cost objectives militate against installing a plurality of paired SMHs at strategic locations in a local area network for the sole purpose of facilitating occasional testing of the network at that particular node.

The use of impedance-matching coupling transformers is widely known in the digital data transmission art for interconnecting devices and media of different impedances. However, for digital data transmission, such coupling transformers are usually designed for use over a limited band of digital transmission speeds or rates. It may be theoretically possible to custom design a coupling transformer to meet a very wide frequency bandwidth needed to transmit digital signals at rates of from ten megabaud to significantly over one-hundred megabaud. However, it would be highly unlikely that such a custom-made coupling transformer would meet cost objectives (mentioned above) in order to permit widespread permanent installation at strategic locations throughout a local area network where monitoring and transmission analysis MIGHT be desired in the future.

Impedance matching can also be accomplished using discrete passive electronic devices such as individual capacitors and inductors. However, at such digital transmission speeds, design difficulties such as component and conductor placement and orientation pose significant design difficulties which would be expected to affect adversely upon production yield.

It is theoretically possible to use operational amplifiers to present a very high input impedance to a digital transmission line and a fairly low output impedance to a transmission analyzer. However, since operation is expected to take place at one-hundred-plus megabaud speeds, the maximum frequency capability of the operational amplifier must be many times higher than the baud (bits per second) of the digital data transmission signal. Such high-frequency operational amplifiers exist. However, there are two conductors comprising each simplex transmission line. There must be a separate operational amplifier for each conductor of the transmission line in order to reproduce the positive and negative signals involved. Two operational amplifiers connected to the two conductors of a digital data transmission line must have the same maximum frequency capability. Otherwise the positive and negative transitions of the amplified digital data signals will lack and thus impair the operation of the digital transmission analyzer.

SUMMARY OF THE INVENTION

In accordance with one aspect of the present invention, the input terminals of two high-frequency operational amplifiers, that are manufactured on a single integrated circuit die, are connected to the two conductors of a digital data transmission line serving a local area network. The output terminals of the two operational amplifiers are connected through a suitable impedance match to the input of the digital transmission analyzer.

It is an object of the present invention to provide a permanent, inexpensive facility in multiple locations of a local area network to allow monitoring of data transmission traffic without disrupting ongoing data transmission by either interrupting transmission or upsetting its characteristic transmission impedance.

It is another object of the present invention to provide an interface or monitor port on a local area data transmission network for use with either simplex and half-duplex transmission or with full duplex transmission.

It is still another object of the present invention to provide a monitor port that is sufficiently inexpensive that it can be installed at a plurality of nodes at the initial installation of a local area network transmission system and left in place, permanently.

It is an object of the present invention to provide a monitor port in a local area digital transmission network that will accommodate a wide range of digital transmission speeds, using high-speed components with basically DC coupling.

The above an other objectives are achieved by monitoring a local area network transmission line with a monitor port interface in a parallel connection across the transmission line, that has exceedingly high frequency capability and with a high input impedance with respect to the impedance of the local area network transmission line itself, so that the testing process is not invasive or disruptive of the transmission line and is capable of operating over a wide range of transmission speeds. The monitor port or interface has an output impedance that matches the input impedance of a transmission analyzer, typically, about one-hundred ohms.

BRIEF DESCRIPTION OF THE DRAWINGS

A more complete understanding of the present invention will be had from the following detailed description when considered in conjunction with the accompanying drawing which schematically illustrates the use of paired operational amplifiers to couple the relatively low input impedance of two transmission analyzers to a duplex transmission facility or line having a transmission impedance even lower than the input impedance of the transmission analyzer.

DETAILED DESCRIPTION OF THE BEST MODE AND INDUSTRIAL APPLICABILITY

The following Detailed Description is divided into sections which have section titles to indicate the general nature of the information that follows. The sections and their titles are intended solely to assist in organization of the description and to aid a reader. These section titles are not intended to indicate that information suggested by any one section title is not contained in any other section.

Referring now to the accompanying drawing, a full duplex transmission channel or line 10 of a local area network links two digital data ports 12 and 14. This transmission line 10 might be a part of an Ethernet local area network or LAN with two simplex, T-type, twisted-wire pairs, each pair constituting a transmission line 16 and 18. Alternatively, each simplex line 16 or 18 can be a fifty-ohm coaxial cable.

Each pair or line, 16 and 18 carries simplex transmission, ie., transmission in only one direction. In the present example shown in the accompanying drawing, the conductor pair or line 16 carries simplex transmission from left to right. That is, as to the line 16, the port 12 is the transmitter and the port 14 is the receiver. Similarly, the pair or line 18 carries simplex transmission from right to left. That is, as to the line 18, the port 14 is the transmitter and the port 12 is the receiver.

A test site, at which testing of the digital data transmission system is desired, will preferably be co-located with one of the ports 12, or 14. However, the test could also be located in some equipment room, through which the transmission line is routed, remote from any local area network port. Such transmission lines 16 and 18, if twisted-wire pairs, are usually terminated in eight-pin modular communication connectors usually designated by the term "RJ45.1." The ubiquitous eight-pin RJ45 modular connector is found with almost every desktop computer in a large office that has a LAN linking many desktop computers to a "file server" computer.

RJ45 plugs are provided at the ends of the lines 16 and 18 wherever the lines 16 and 18 are to be terminated. For example, the lines 16 and 18 will be connected by such RJ45 plugs (not individually shown in the accompanying drawing) of RJ45 connectors (also not shown) where the lines 16 and 18 are connected to the ports 12 and 14.

At the desired test site, the lines 16 and 18 are also terminated in RJ45 plugs. These RJ45 plugs on the lines 16 and 18 are plugged into mating RJ45 sockets which sockets are part of a LAN monitor port circuit device 20.

Line Connection to Monitor Port

Each RJ45 plug and mating socket combination comprises an RJ45 connector, and each plug and its associated socket are not shown separated in the accompanying drawing. They are only shown in their connected condition, as a complete connector. Four RJ45 connectors are shown in the accompanying drawing and are identified by the reference numbers 24, 26, 28, and 30.

The lines 16 and 18 extending from the port 12 are connected to the type RJ45 connector 26. The twisted-wire pair comprising the line 16 extending from the port 12 is preferably connected to pins 1 and 2 on the RJ45 connector 26. The twisted-wire pair comprising the line 18 extending from the port 12 is preferably connected to pins 3 and 6 of the RJ45 socket 26.

Similarly, the lines 16 and 18 extending from the port 14 are connected to the type RJ45 connector 28. The twisted-wire pair comprising the line 16 extending from the port 14 is preferably connected to the number 1 and 2 pins (not separately shown) on the RJ45 connector 28. The twisted-wire pair comprising the line 18 extending from the port 14 is preferably connected to the number 3 and 6 pins (not separately shown) of the RJ45 socket 28. The sockets of the RJ45 connectors 24, 26, 28, and 30 are an integral part of the monitor port 20 of the present invention. The number 1 pins of the sockets for the connectors 26 and 28 are directly interconnected. The number 2 pins of the sockets for the connectors 26 and 28 are directly interconnected. The same is true of the number 3 pins and the number 6 pins of the sockets for the connectors 26 and 28. Therefore, the pairs or transmission lines 16 and 18 are connected directly through the monitor port 20 without any apparent invasion of the transmission paths between the nodes 12 and 14.

Operational Amplifiers

The conductors that interconnect the number 1 pins and interconnect the number 2 pins of the sockets for the connectors 26 and 28 are also connected directly to the positive input terminals of two differential or operational amplifiers 34 and 36. Since an operational amplifier has exceedingly high input impedance, both input terminals are also connected to a ground or common return by a 10K resistor 38 and 40. The resistors 38 and 40 serve as pull-down resistors to prevent the voltage at the input terminals of the differential or operational amplifiers 34 and 36 from becoming undefined at some point in their operation.

In order to assure that the operational amplifiers 34 and 36 have functional parameters—especially frequency response—that are as closely matched as possible, they are preferably manufactured on a single semiconductor integrated circuit (IC) die 42. Dual operational amplifier ICs are available on the commercial market with a variety of functional parameters. One such dual operational amplifier IC with a high frequency response is manufactured by Analog Devices, Inc., 1 Technology Wae, Norwood, Mass. 02062-9106 and sold under the part number AD8002.

The common ground return of the two resistors 38 and 40 places the two wires of the local area network transmission line 16 across the two 10k-ohm resistors that are thus connected in series, meaning that the resultant total resistance between the two conductors of the line 16 is the sum of the two 10k-ohm resistors, or 20,000 ohms. The 20,000 ohms of the two 10k resistors is very much higher than the nominal 50-ohm impedance of the transmission line 16. Therefore, the loading of 10k resistors to ground is not significant and does not materially affect the operation of the local area network transmission line 16.

The negative input terminals of both of the operational amplifiers 34 and 36 are interconnected through a 2K resistor 44.

As explained below in connection with negative feedback resistors, this interconnection provides a reference voltage for the negative input terminals of the two operational amplifiers 34 and 36.

As explained above, the typical digital transmission signals on the signal lines 16 and 18 are one-volt, peak-to-peak, push-pull, direct current (DC) pulses at a transmission impedance of approximately fifty ohms. It is desired to deliver as exact copy as possible of the transmission signals to a separate transmission analyzer (TA) at approximately one-hundred ohms.

To facilitate simple explanation and easy understanding, assume that a binary "1" is represented as a positive or plus-one-volt DC pulse on one of the two conductors of the line 16, with respect to the other of its two conductors. Assuming a neutral, unbiased signal line, that means a plus-one-half-volt pulse with respect to a reference ground.

A binary "0" is then represented as a minus-one-volt DC pulse on the other of the two conductors of the line 16 with respect to the first conductor. Again, with respect to a neutral reference ground, the binary "0" is a negative or minus-one-half-volt pulse with respect to the neutral reference ground. These plus and minus voltage are thus alternatively applied to the positive inputs of the two differential amplifiers 34 and 36.

The output terminal of each operational amplifier 34 and 36 is connected to its negative input terminal by a 1K negative feedback resistor 46 and 48 in a conventional negative feedback arrangement for controlling amplifier gain. Therefore, each operational amplifier 34 and 36 has a nominal voltage gain of 2,000 ohms divided by 1,000 ohms or "two," ignoring the very low output impedance of the differential amplifiers, themselves. Consequently, the resulting push-pull outputs of the differential amplfiers 34 and 36 are two-volt peak-to-peak signals or one-volt excursions from neutral ground potential.

The output of the operational amplifier 34 is connected through a nominal fifty-ohm output resistor 52 to the number 3 pin of the RJ45 socket for the connector 24. The output of the operational amplifier 36 is connected through another nominal fifty-ohm output resistor 54 to number 6 pin of the RJ45 socket for the connector 24.

The Transmission Analyzer

The input of a digital transmission testing apparatus or transmission analyzer (TA) 60 has an RJ45 plug that connects the TA's input to (for example) the number 3 and 6 pins of the socket for the connector 24. The two fifty-ohm output resistors 52 and 54 are thus connected in series from the push-pull outputs of the two differential amplifiers 34 and 36 to the input of the TA 60, thereby giving the combined outputs of the operational amplifiers 34 and 36 the necessary one-hundred-ohm output impedance needed to match the one-hundred-ohm input impedance of the TA 60.

Since the output impedance of the monitor port 20 to the TA 60 is two times fifty ohms or one hundred ohms, the same as the input impedance of the TA 60, the voltage of the signals produced at the outputs of the operational amplifiers 34 and 36 are divided in half as they pass through a one-hundred-ohm output impedance to a one-hundred-ohm input impedance. That is, the voltage of the signals supplied to the TA 60 is half of the voltage of those signals as they appear at the output terminals of the operational amplifiers 34 and 36. Therefore, the two-volt, peak-to-peak signal voltages at the outputs of the differential amplifiers 34 and 36 are reduced to one-volt, peak-to-peak signals by the time that they reach the input of the TA 60, thereby nominally duplicating the transmission signals on the transmission line 16.

From a different perspective, since the gain of the operational amplifiers 34 and 36 is "two," the voltage of the signals at the output terminals of the operational amplifiers 34 and 36 is double the voltage of the signals on the transmission line 16.

Therefore, the TA 60 "sees" the same signal voltage as the transmission line 16, for a net voltage gain of "one." Consequently, the TA 60 is able to monitor the digital transmission signals on the line 16 without materially altering, loading, or interfering with data transmission.

In monitoring the digital transmission signals on the line 16, it is important that the TA 60 "sees" the same, preferably symmetrically-shaped signals as well as the same voltage level of the digital data signals on the line 16. For this reason, the operational amplifiers 34 and 36 should preferably have the same frequency response, which is difficult at the very high frequencies of the latest digital transmission channels.

The above description relates to routing simplex data transmission signals going from the port 12 to the port 14 on the line 16 through the monitor port 20 for analysis. The highimpedance inputs of the operational amplifiers 34 and 36 are connected in parallel with the two conductors connected to the transmission line 16 where it passes from the RJ45 connector 26 to the RJ45 connector 28. The gain of the operational amplifiers 34 and 36 and their output impedance are selected to match the input impedance of the TA 60 so as to replicate the transmission line voltage signals at the input of the TA, for conventional transmission protocol analysis by the TA. Connecting and disconnecting the TA 60 at the RJ45 connector 24 has no significant effect on the transmission line 16 because of the isolation and high input impedance provided by the operational amplifiers 34 and 36.

It will be evident to a person having ordinary skill in the art that it does not matter to the operational amplifiers 34 and 36 whether the digital transmission traffic is flowing from the port 12 to the port 14 in the line 16 or from the port 14 to the port 12. It is only important that the digital traffic "appear" on the conductor that links the number 1 pin of the socket for the connector 26 to the number 1 pin of the socket for the connector 28 and the conductor that links the number 2 pin of the socket for the connector 26 to the number 2 pin of the socket for the connector 28. Therefore, the circuit comprising the operational amplifiers 34 and 36 will function exactly the same if the line 16 were a half-duplex transmission line and traffic could flow in the line 16 alternately from the node 12 to the node 14 and from the node 14 to the node 12.

It will also be evident to a person having ordinary skill in the art that the operational amplifier circuit of the monitor port 20 could alternatively be incorporated into the input of the TA 60 without departing from the spirit of scope of the present invention.

Monitoring Transmission on line 18

It is also preferable to be able to monitor the transmission traffic traveling from the port 14 to the port 12 on the simplex line 18. Capability to monitor traffic in both directions is preferred so as to provide full monitoring service capability for the full duplex transmission channel or line 10. Therefore, transmission signal traffic on the transmission line 18 also passes on conductors from the number 3 and number 6 pins of the RJ45 socket for the connector 28 to the number 3 and number 6 pins of the RJ45 socket for the connector 26.

A second operational amplifier circuit is shown in the right half of the monitor port 20. That second operational amplifier circuit is identical to the above-described operational amplifier circuit illustrated on the left half of the monitor port, as shown in the accompanying drawing. The operational amplifiers and their associated resistors shown in the second operational amplifier circuit on the right half of the monitor port 20 are identified using the same reference numbers (except for the addition of the letter "A") that were applied to the corresponding operational amplifiers and associated resistors that were used to describe the identical circuit on the left side of the monitor port 20, as depicted in the accompanying drawing. Since the two operational amplifier circuits are identical, there is no need to repeat the above detailed description for the second operational amplifier circuit.

The positive input terminals of the operational amplifiers 34A and 36A are respectively connected to the conductors that connect the number 3 and number 6 pins of the socket for the RJ45 connector 28 to the number 3 and number 6 pins of the socket for the RJ45 connector 26. Those pins carry the digital signals being transmitted on the two conductors of the transmission line 18.

The output terminals of the operational amplifiers 34A and 36A are connected through output resistors 52A and 54A, respectively, to the number 3 and number 6 pins of the socket for the RJ45 connector 30. The number 3 and number 6 pins for the plug of the RJ45 connector 30 are connected to the input of a TA 60A. Therefore, the TA 60A is able to monitor the traffic on the transmission line 18 in a manner identical to the manner in which the TA 60 monitors the traffic on the transmission line 16.

In order to match the frequency response of the operational amplifier 34 to the frequency response of the operational amplifier 36, the two operational amplifiers are preferably manufactured on a single integrated circuit (IC) die and therefore housed in a single IC package 42. Therefore, the monitor port 20 would preferably comprise only the two operational amplifier ICs 42 and 42A (one for the line 16 and one for the line 18), their associated resistors, the RJ45 connector sockets, and a very modest power supply, all on a single printed circuit board inside a small case. Consequently, the monitor port 20 can be a very low-cost device. So low cost, in fact, that several of them can be installed at strategic locations about a local area network during any down-time, upgrade, or other deenergization of the LAN or even when the LAN is initially installed. The monitor ports 20 can then be economically left in place on a permanent basis. Technicians can then plug TA(s) into the sockets for the RJ45 connectors 24 and 30 with impunity and at any convenient time when monitoring is desired.

While the form of apparatus herein described constitutes a preferred embodiment of this invention, it is to be understood that the invention is not limited to this precise form of apparatus, and that changes may be made therein without departing from the scope of the invention which is defined in the appended claims.

I claim:

1. An interface device for non-invasive connection of a transmission testing and analyzing apparatus having an input impedance to a first local area network digital data transmission line between a transmitter and a receiver, said transmission line having a first conductor; and a second conductor for conveying digital signals from said transmitter to said receiver, a transmission impedance, and a maximum digital data transmission rate, said interfacing device comprising:

a first operational amplifier on an integrated circuit die and having a sinusoidal frequency response substantially higher than the maximum digital data transmission rate and having an input terminal and an output terminal and an input impedance much higher than the impedance of said transmission line:

means for connecting the input terminal of said first operational amplifier to the first conductor of said transmission line;

a second operational amplifier on the same integrated circuit die as said first operational amplifier and having a sinusoidal bandwidth capability substantially higher than the maximum digital data transmission rate and having an input terminal and an output terminal and an input impedance much higher than the impedance of said transmission line;

means for connecting the input terminal of said second operational amplifier to the second conductor of said transmission line;

the output terminals of said operational amplifiers having an impedance substantially matching the input impedance of said transmission testing and analyzing apparatus;

means for connecting the output terminals of said first and second operational amplifiers to the input of said transmission testing and analyzing apparatus;

wherein said means for connecting the output terminals comprises an output connector connected to the outputs of the first and second operational amplifiers and to the input of the transmission testing and analyzing apparatus for connecting said transmission testing and analyzing apparatus to the outouts of the first and second operational amplifiers; and wherein said output terminals are connected to said output connector through at least one output resistance chosen, in the aggregate, to match said input impedance of said transmission testing and analyzing apparatus.

2. An interface device for non-invasive connection of a transmission testing and analyzing apparatus having an input impedance to a first local area network digital data transmission line between a transmitter and a receiver, said transmission line having a first conductor and a second conductor for conveying digital signals from said transmitter to said receiver, a transmission impedance, and a maximum digital data transmission rate, said interfacing device comprising:

a first operational amplifier on an integrated circuit die and having a sinusoidal frequency response substantially higher than the maximum digital data transmission rate and having an input terminal and an output terminal and an input impedance much higher than the impedance of said transmission line;

means for connecting the input terminal of said first operational amplifier to the first conductor of said transmission line;

a second operational amplifier on the same integrated circuit die as said first operational amplifier and having a sinusoidal bandwidth capability substantially higher than the maximum digital data transmission rate and having an input terminal and an output terminal and an input impedance much higher than the impedance of said transmission line;

means for connecting the input terminal of said second operational amplifier to the second conductor of said transmission line;

the output terminals of said operational amplifiers having an impedance substantially matching the input impedance of said transmission testing and analyzing apparatus;

means for connecting the output terminals of said first and second operational amplifiers to the input of said transmission testing and analyzing apparatus; and wherein said means for connecting the input terminals of said operational amplifiers comprises:

a first connector for receiving digital data transmission on said transmission line from the transmitter and having two conductors connected to said first and second conductors of said transmission line;

a second connector for transmitting digital data transmission on said transmission line to said receiver and having two conductors connected to said first and second conductors of said transmission line and also electrically connected to said two conductors of the first connector for completing the digital data transmission from said transmitter to said receiver; and said input terminal of said first operational amplifier being connected to one of said two conductors connected between said first connector and said second connector.

3. An interface device according to claim 2 wherein the input terminal of said second operational amplifier is connected to the other of said two conductors connected between said first connector and said second connector.

4. A system for the non-invasive protocol analysis of local area network digital data transmission systems having at least one transmission line with a first conductor and a second conductor, a transmission impedance, and a maximum transmission rate, comprising:

a first digital transmission protocol analyzer for analyzing the protocol portions of packets of data transmitted on a transmission line used in a local area network, said analyzer having an input impedance;

a first operational amplifier having a positive input terminal, a negative input terminal, an output terminal and a bandwidth capability substantially higher than the maximum transmission rate and having an input impedance much higher than said transmission impedance, the positive input terminal of said first operational amplifier being connected to said first conductor of said transmission line and the output terminal connected to the input of the digital transmission protocol analyzer;

a resistive negative feedback connection between the outout terminal of said first operational amplifier and the negative input terminal of said first operational amplifier;

a reference voltage level resistively connected to the negative input terminal of the first operational amplifier; and wherein the output terminal of said first operational amplifier is connected to the input of said digital transmission protocol analyzer through an output matching impedance which is compatible with the input impedance of said digital transmission protocol analyzer, such that, together with the gain of the first operational amplifier, replicates the digital transmission signal at the input of the digital transmission protocol analyzer.

5. A system for the non-invasive protocol analysis of local area network digital data transmission systems according to claim 4 further including a first connector electrically connected between the output matching impedance and the input of said digital transmission protocol analyzer for separably connecting said digital transmission protocol analyzer to the output of said first operational amplifier.

6. A system for the non-invasive protocol analysis of local area network digital data transmission systems according to claim 5 further including a second connector electrically connected between the positive input terminal of said first operational amplifier and said first conductor of said transmission line for connecting said first operational amplifier to said transmission line.

7. A system for the non-invasive protocol analysis of local area network digital data transmission systems having at least one transmission line with a first conductor and a second conductor, a transmission impedance, and a maximum transmission rate, comprising:

a first digital transmission protocol analyzer for analyzing the protocol portions of packets of data transmitted on a transmission line used in a local area network, said analyzer having an input impedance;

a first operational amplifier having a positive input terminal, a negative input terminal, an output terminal and a bandwidth capability substantially higher than the maximum transmission rate and having an input impedance much higher than said transmission impedance, the positive input terminal of said first operational amplifier being connected to said first conductor of said transmission line and the output terminal connected to the input of the digital transmission protocol analyzer;

a resistive negative feedback connection between the output terminal of said first operational amplifier and the negative input terminal of said first operational amplifier;

a reference voltage level resistively connected to the negative input terminal of the first operational amplifier; and a first connector electrically connected between the output terminal of said first operational amplifier and the input of said digital transmission protocol analyzer for separably connecting said digital transmission protocol analyzer to the output of said first operational amplifier.

8. A system for the non-invasive protocol analysis of local area network digital data transmission systems according to claim 7 further including a second connector electrically connected between the positive input terminal of said first operational amplifier and said first conductor of said transmission line for separably connecting said first operational amplifier to said transmission line.

9. A system for the non-invasive protocol analysis of local area network digital data transmission systems having at least one transmission line with a first conductor and a second conductor, a transmission impedance, and a maximum transmission rate, comprising:

a first digital transmission protocol analyzer for analyzing the protocol portions of packets of data transmitted on a transmission line used in a local area network, said analyzer having an input impedance;

a first operational amplifier having a positive input terminal, a negative input terminal, an output terminal and a bandwidth capability substantially higher than the maximum transmission rate and having an input impedance much higher than said transmission impedance, the positive input terminal of said first operational amplifier being connected to said first conductor of said transmission line and the output terminal connected to the input of the digital transmission protocol analyzer;

a resistive negative feedback connection between the output terminal of said first operational amplifier and the negative input terminal of said first operational amplifier;

a reference voltage level resistively connected to the negative input terminal of the first operational amplifier; and a second connector electrically connected between the positive input terminal of said first operational amplifier and said first conductor of said transmission line for separably connecting said first operational amplifier to said transmission line.

10. A system for the non-invasive protocol analysis of local area network digital data transmission systems having at least one transmission line with a first conductor and a second conductor, a transmission impedance, and a maximum transmission rate, comprising:

a first digital transmission protocol analyzer for analyzing the protocol portions of packets of data transmitted on a transmission line used in a local area network, said analyzer having an input impedance;

a first operational amplifier having a positive input terminal, a negative input terminal, an output terminal and a bandwidth capability substantially higher than the maximum transmission rate and having an input impedance much higher than said transmission impedance, the positive input terminal of said first operational amplifier being connected to said first conductor of said transmission line and the output terminal connected to the input of the digital transmission protocol analyzer;

a resistive negative feedback connection between the output terminal of said first operational amplifier and the negative input terminal of said first operational amplifier; and a reference voltage level resistively connected to the negative input terminal of the first operational amplifiers;

a second operational amplifier having a positive input terminal, a negative input terminal, an output terminal and a bandwidth capability substantially higher than the maximum transmission rate and having an input impedance much higher than said transmission impedance, the positive input of said operational amplifier being connected to the second conductor of said transmission line; and wherein the output terminals of said first and second operational amplifiers are connected to the input of said digital transmission protocol analyzer through an output matching impedance which is compatible with the input impedance of said digital transmission protocol analyzer, such that, together with the gain of the first and second operational amplifiers, replicates the digital transmission signal at the input of the digital transmission protocol analyzer.

11. A system for the non-invasive protocol analysis of local area network digital data transmission systems according to claim 10 further including a first connector electrically connected between the output matching impedance of said first and second operational amplifiers and the input of said digital transmission protocol analyzer for separably connecting said digital transmission protocol analyzer to the outputs of said first and second operational amplifiers.

12. A system for the non-invasive protocol analysis of local area network digital data transmission systems according to claim 11 further including a second connector electrically connected between the positive input terminals of said first and second operational amplifiers and said first and second conductors of said transmission line for separably connecting said first and second operational amplifiers to said transmission line.

13. A system for the non-invasive protocol analysis of local area network digital data transmission systems having at least one transmission line with a first conductor and a second conductor, a transmission impedance, and a maximum transmission rate, comprising:

a first digital transmission protocol analyzer for analyzing the protocol portions of packets of data transmitted on a transmission line used in a local area network, said analyzer having an input impedance;

a first operational amplifier having a positive input terminal, a negative input terminal, an output terminal and a bandwidth capability substantially higher than the maximum transmission rate and having an input impedance much higher than said transmission impedance, the positive input terminal of said first operational amplifier being connected to said first conductor of said transmission line and the output terminal connected to the input of the digital transmission protocol analyzer;

a resistive negative feedback connection between the output terminal of said first operational amplifier and the negative input terminal of said first operational amplifier; and a reference voltage level resistively connected to the negative input terminal of the first operational amplifier;

a second operational amplifier having a positive input terminal, a negative input terminal, an output terminal and a bandwidth capability substantially higher than the maximum transmission rate and having an input impedance much higher than said transmission impedance, the positive input of said operational amplifier being connected to the second conductor of said transmission line; and a first connector electrically connected between the output terminals of said first and second operational amplifiers and the input of said digital transmission protocol analyzer for separably connecting said digital transmission protocol analyzer to the outputs of said first and second operational amplifiers.

14. A system for the non-invasive protocol analysis of local area network digital data transmission systems according to claim 13 further including a second connector electrically connected between the positive input terminals of said first and second operational amplifiers and said first and second conductors of said transmission line for separably connecting said first and second operational amplifiers to said transmission line.

15. A system for the non-invasive protocol analysis of local area network digital data transmission systems having at least one transmission line with a first conductor and a second conductor, a transmission impedance, and a maximum transmission rate, comprising:

a first digital transmission protocol analyzer for analyzing the protocol portions of packets of data transmitted on a transmission line used in a local area network, said analyzer having an input impedance;

a first operational amplifier having a positive input terminal, a negative input terminal, an output terminal and a bandwidth capability substantially higher than the maximum transmission rate and having an input impedance much higher than said transmission impedance, the positive input terminal of said first operational amplifier being connected to said first conductor of said transmission line and the output terminal connected to the input of the digital transmission protocol analyzer;

a resistive negative feedback connection between the output terminal of said first operational amplifier and the negative input terminal of said first operational amplifier; and a reference voltage level resistively connected to the negative input terminal of the first operational amplifier;

a second operational amplifier having a positive input terminal, a negative input terminal, an output terminal and a bandwidth capability substantially higher than the maximum transmission rate and having an input impedance much higher than said transmission impedance, the positive input of said operational amplifier being connected to the second conductor of said transmission line; and a second connector electrically connected between the positive input terminals of said first and second operational amplifiers and said first and second conductors of said transmission line for separably connecting said first and second operational amplifiers to said transmission line.

* * * * *

UNITED STATES PATENT AND TRADEMARK OFFICE
CERTIFICATE OF CORRECTION

PATENT NO. : 5,878,030
DATED : March 2, 1999
INVENTOR(S) : W. Brian Norris

It is certified that error appears in the above-identified patent and that said Letters Patent is hereby corrected as shown below:

At column 1, line 40, change "multimega-baud" to --multi-megabaud--.

At column 2, line 41, after "lack" add --symmetry--.

At column 3, line 61, change "RJ45.1" to --RJ45.--

At column 10, line 16, after "for" add --separably--.

Signed and Sealed this

Fourteenth Day of December, 1999

Q. TODD DICKINSON

Attest:

Attesting Officer

Acting Commissioner of Patents and Trademarks